US008924398B2

(12) United States Patent
Garza et al.

(10) Patent No.: US 8,924,398 B2
(45) Date of Patent: Dec. 30, 2014

(54) LOG-BASED DDL GENERATION (75) Inventors: Oscar J. Garza, Cedar Park, TX (US);
Yanmin Liu, Austin, TX (US); Kenneth M. McDonald, Cedar Park, TX (US)

(73) Assignee: BMC Software, Inc., Houston, TX (US)

( * ) Notice: Subject to any disclaimer, the term of this patent is extended or adjusted under 35 U.S.C. 154(b) by 398 days.

(21) Appl. No.: 13/070,388

(22) Filed: Mar. 23, 2011

(65) Prior Publication Data
US 2012/0246179 A1 Sep. 27, 2012

(51) Int. Cl.
*G06F 17/30* (2006.01)
(52) U.S. Cl.
CPC ........ *G06F 17/303* (2013.01); *G06F 17/30297* (2013.01)
USPC ............................ 707/752; 707/683; 707/684
(58) Field of Classification Search
CPC ............ G06F 11/1471; G06F 2201/80; G06F 17/30297; G06F 17/303
USPC .................................. 707/674, 752, 683, 684
See application file for complete search history.

(56) References Cited

U.S. PATENT DOCUMENTS

| | | | | |
|---|---|---|---|---|
| 4,648,031 | A * | 3/1987 | Jenner | 714/10 |
| 5,717,924 | A * | 2/1998 | Kawai | 1/1 |
| 6,421,677 | B1 * | 7/2002 | DeKimpe et al. | 1/1 |
| 6,453,322 | B1 * | 9/2002 | DeKimpe et al. | 1/1 |
| 6,792,435 | B1 * | 9/2004 | Ruddy | 1/1 |
| 2002/0116364 | A1 * | 8/2002 | Seki et al. | 707/1 |
| 2002/0184207 | A1 * | 12/2002 | Anderson et al. | 707/4 |
| 2008/0243945 | A1 * | 10/2008 | Hanus et al. | 707/202 |
| 2008/0249988 | A1 * | 10/2008 | Chaitanya et al. | 707/3 |
| 2009/0106329 | A1 * | 4/2009 | Masuda | 707/202 |
| 2009/0300075 | A1 * | 12/2009 | Guan et al. | 707/202 |
| 2011/0072207 | A1 * | 3/2011 | Jin et al. | 711/112 |

* cited by examiner

*Primary Examiner* — Shiow-Jy Fan (57) ABSTRACT

Systems, methods, and computer readable media for automatically generating Data Definition Language (DDL) commands from database log information is described. In general, techniques are disclosed for analyzing database log entries to identify those associated with targeted DDL commands and associating those entries with a DDL command object. The DDL command object may be used (immediately or at some later time) to generate a DDL commands corresponding to the (possibly many) aggregated log records associated with the command object. The use of multiple database log entries as described herein enables the generation of DDL commands that capture database activity occurring over a period of time (full time context auditing) and can, therefore, naturally account for database schema changes.

20 Claims, 5 Drawing Sheets

LOG-BASED DDL GENERATION

BACKGROUND

This disclosure relates generally to the field of database management. More particularly, but not by way of limitation, it relates to a technique for automatically generating Data Definition Language (DDL) statements based on database log entries.

In its most generic form, DDL refers to a computer language for defining data structures. As used in the context of modern database management systems (DBMS), DDL most often refers to a subset of the Structured Query Language (SQL) directed to the creation, modification and examination of a database's schema. Illustrative DDL statements include the CREATE object, DROP object and ALTER object statements.

In general, each operation executed by a DBMS is recorded in one or more log files. Further, execution of a single DDL statement (e.g., a DROP TABLE statement) can generate, cause or result in many (hundreds) of log entries. Now, from time to time it may be beneficial to replicate the action of one or more DDL statements (e.g., to perform a MIGRATE operation) or to back out inopportune DDL statements (e.g., to perform an UNDO operation). In the prior art, the ability to automatically generate MIGRATE and UNDO DDL is limited. For example, while some tools exist to generate DDL statements based on a single log entry or a snapshot of a database (e.g., a tablespace) at a certain time, such methods are unable to capture changes made to the database's schema over time so that UNDO DDL may be generated at a later time. Thus, it would be beneficial to provide a mechanism to automatically generate DDL statements based on multiple database log entries.

SUMMARY

In one embodiment the invention provides a method to identify and aggregate multiple database log records (entries) for the purpose of automatically generating Data Definition Language (DDL) commands or statements therefrom. The method includes extracting relevant log entries from a database log file. From the relevant log entries, individual log entries associated with the execution of a specific DDL command may be identified and, after further identifying a "start" and "end" log record for the specific DDL command, associated with or assigned to a structure used to aggregate log records. Once all the log records for the specific DDL command have been identified, they may be sorted. In particular, to accurately generate some DDL commands it has been found (surprisingly) necessary to not order certain log entries in strict time sequence. By way of example, certain UNDO operations based on database log entries must be placed out of time-order to accurately unwind the original DDL operation. A computer executable program to implement the disclosed methods may be stored in any media that is readable and executable by a computer system.

DETAILED DESCRIPTION

This disclosure pertains to systems, methods, and computer readable media for automatically generating Data Definition Language (DDL) commands from database log information. In general, techniques are disclosed for analyzing database log entries to identify those associated with targeted DDL commands and associating those entries with a DDL command object. The DDL command object may be used (immediately or at some later time) to generate a DDL command corresponding to the (possibly many) aggregated log records associated with the command object. Unlike the prior art for example, the use of multiple database log entries as described herein permit "DDL Objects" to be stored so that UNDO DDL commands may be generated at a later time.

In the following description, for purposes of explanation, numerous specific details are set forth in order to provide a thorough understanding of the inventive concept. As part of this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment. It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the data processing field having the benefit of this disclosure.

For illustrative purposes only, various embodiments for automatically generating DDL commands from aggregated log entries (also referred to as records) will be described in the context of the DB2® database management system (DBMS). (DB2 is a registered trademark of the International Business Machines corporation.) Specifically, and while not limiting the following claims, the primary disclosed embodiments are directed to the automatic generation of DDL statements from logged catalog insert, delete and update records. Such information may be found in the DB2 Recovery Log. In one embodiment the DDL commands of interest include the ALTER, COMMENT ON, CREATE, DROP, GRANT, LABEL ON, RENAME and REVOKE statements. In other embodiments, DDL may include fewer, additional or different statements.

Figure 1:
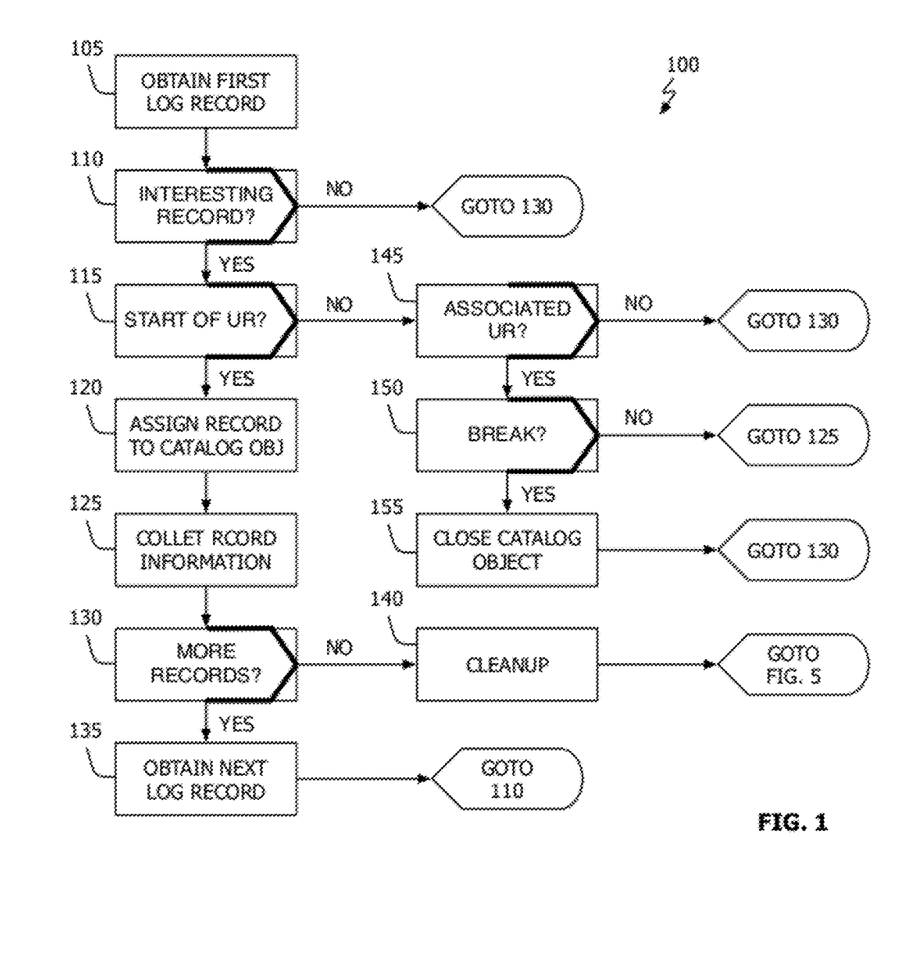
FIG. 1 shows, in flowchart form, a Catalog Object generation operation in accordance with one embodiment.

Referring to FIG. 1, illustrative Catalog Object generation operation 100 begins when a first record is obtained from a database log (block 105). In one embodiment, the starting and ending points for operation 100 may be specified in terms of time (as may be recorded by a timestamp field within a log record). In another embodiment, the starting and ending points for operation 100 may be a specified record within the log file (e.g., specified in terms of a record's relative byte address, RBA). It will be recognized that when the active DB2 Recovery Log fills, it may be archived and the time range and RBAs of the records in the archived log may be recorded in a Boot Strap Data Set (BSDS). Accordingly, if the specified starting and stopping points (i.e., the scan range) of operation 100 are outside the scope of the currently active log, the BSDS may be used to identify the log files needed to encompass the operation's specified scan range. Once a record is obtained, a check may be made to determine if it is "interesting" (block 110). As used herein, the term "interesting" refers to whether the record is part of a unit of recovery, is associated with a DDL command and is directed to a table of interest (see discussion below with respect to FIG. 3). This determination may be made by interrogating the database log record.

Figure 2:
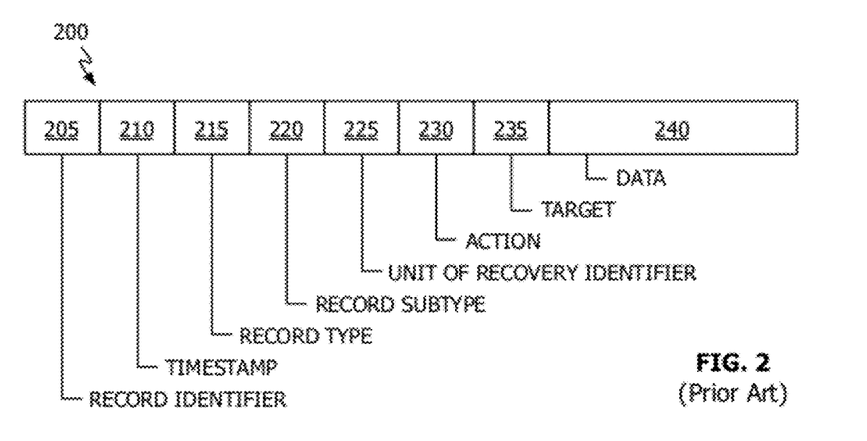
FIG. 2 shows the structure of an illustrative log record in accordance with one embodiment.

Commercial database log files typically contain a number of different record types. DB2, for example, supports three principal log record types: (1) unit of recovery; (2) checkpoint; and (3) database page set control. Actions that change a database (e.g., insert, delete and update actions) are recorded within "units of recovery." Referring to FIG. 2, records (e.g., record 200) in a DB2 Recovery Log functionally include at least the following: record identifier field 205 (e.g., an RBA); timestamp field 210; type field 215 (e.g., identifying the record as belonging to a unit of recovery); subtype field 220 (e.g., identifying the record as the beginning or end record in a unit of recovery); unit of recovery identifier field 225 (uniquely identifying a particular unit of recovery—this identifier is the same for all records in a common unit of recovery); action field 230 (e.g., indicating the record is associated with an insert, delete or update action); target field 235 (identifying the target of the recorded action such as, for example, a catalog table); and data field 240.

Returning now to FIG. 1, if the current record is not interesting (the "NO" prong of block 110), processing continues at block 130 as discussed below. If the current record is interesting (the "YES" prong of block 110), a further check may be made to determine if the record signals the beginning of a unit of recovery (block 115). In DB2 this determination may be made, at least in part, by inspecting a record's subtype field 220. If the current record is the first record in a unit of recovery (the "YES" prong of block 115), the record may be provisionally assigned to a Catalog Object (block 120). Thereafter, all record's associated with the same unit of recovery may be associated with the same Catalog Object (see discussion below with respect to blocks 145-155). In addition, the Catalog Object may be assigned an "activity" value corresponding to a DDL statement (e.g., ALTER, COMMENT ON, CREATE, DROP, GRANT, LABEL ON, RENAME and REVOKE). As used herein, Catalog Objects may be data structures used to capture log record information (see discussion below regarding block 125). Table 1 provides a list of Catalog Objects as may be used for the embodiment specified above and guidelines as to how a log record may be (provisionally) assigned in accordance with block 120.

TABLE 1

Illustrative DDL Command Object Types

| Object | Provisional Assignment Guideline |
| --- | --- |
| Alias | When the record evidences activity against a row in the SYSCOLUMS table, it may be provisionally assigned to the COLUMN object type (see below). This assignment may later be changed to the ALIAS object type if a subsequent record (in the same unit of recovery) evidences activity against a row in the SYSTABLES table having a TYPE = A. |
| Bufferpool | The record evidences activity against a row in the SYSRESAUTH table having an OBTYPE = B. |
| Collection | The record evidences activity against a row in the SYSRESAUTH table having an OBTYPE = C. |
| Column | The record evidences activity against the SYSCOLUMS table. |
| Database | The record evidences activity against the SYSDATABASE or SYSDBAUTH tables. |
| Distinct | The record evidences activity against a row in the SYSDATATYPES and SYSREAUTH with an OBJTYPE = D. |
| Function | The record evidences activity against a row in the SYSROUTINES table having a TYPE = F. |
| GlobalTable | The record evidences activity against a row in the SYSTABLES having a TYPE = G or against any row in the SYSCOLUMNS table. |
| Index | The record evidences activity against, for example, the SYSINDEXES, SYSINDEXPART, or SYSKEYS tables. |
| Package | The record evidences activity against the SYSPACKAUTH table. It will be recognized that packages may be influenced by BIND COMMANDs as well as GRANT and REVOKE DDL. The BIND/REBIND COMMAND may update the SYSPACKAGES, SYSPACKDEP, SYSPACKSTMT, and SYSPACKAUTH tables. In accordance with one embodiment, subsequent records may be needed to determine definitively whether the activity against the SYSPACKAUTH table was related to DDL or a COMMAND and act appropriately. |
| Plan | The record evidences activity against the SYSPLANAUTH table. (Replace BIND tables information above for the Package object with SYSPLAN, SYSPLANDEP, and SYSSTMT.) |
| Procedure | The record evidences activity against a row in the SYSROUTINES table having a TYPE = P. |

TABLE 1-continued

Illustrative DDL Command Object Types

| Object | Provisional Assignment Guideline |
| --- | --- |
| Schema | The record evidences activity against the SYSSCHEMAAUTH table. |
| StorageGroup | The record evidences activity against the SYSSTOGROUP, SYSVOLUMES or SYSRESAUTH (having an OBJTYPE = S) tables. |
| Synonym | The record evidences activity against the SYSSYNONYMS table. |
| SYSCOPY | The record evidences activity against the SYSCOPY table. (It will be recognized that both DDL and Utilities may involve activity against the SYSCOPY table. Accordingly, subsequent records may be needed to distinguish between these two cases.) |
| SystemPrivilege | The record evidences activity against the SYSUSERAUTH table. |
| Table | The record evidences activity against the SYSTABLES, SYSCOLUMNS, SYSFOREIGNKEYS, SYSCOLAUTH, SYSTABAUTH, SYSCHECKS, SYSTABCONST, or SYSINDEXES tables. (It has been empirically determined that assignment of the Table object may require a number of records from a single unit of recovery, and be specific to a developer's unique set of output requirements.) |
| Tablespace | The record evidences activity against the SYSTABLESPACE, SYSTABLEPART, SYSCOPY, or SYSRESAUTH (having an OBTYPE = R) tables. |
| Trigger | The record evidences activity against the SYSTRIGGERS table. |
| View | The record evidences activity against the SYSVIEWS or SYSVIEWDEP tables. |
| Sequence | The record evidences activity against the SYSSEQUENCES, SYSSEQUENCEAUTH, or SYSSEQUENCESDEP tables. |
| Role | The record evidences activity against the SYSROLES table. |
| Context | The record evidences activity against the SYSCONTEXT table. |
| Mask | The record evidences activity against a row in the SYSCONTROLS table having a CONTROL_TYPE = M. |
| Permission | The record evidences activity against a row in the SYSCONTROLS table having a CONTROL_TYPE = R. |

A review of Table 1 shows that activity against the SYSTABLES table (e.g., an insert) could be related to an Alias, GlobalTable, or Table Catalog Object based upon the inserted row's "TYPE" column being "A," "G," or "T." Similarly, activity against the SYSVIEWS table implicates both the Table and View Catalog Objects. For example, if the first record in a unit of recovery is an insert into the SYSVIEWS table, the record could provisionally be assigned to a View Catalog Object. Subsequent activity in the same unit of recovery could implicate the Table Catalog Object because the initiating command could turn out to be a MATERIALIZED QUERY TABLE instead of a VIEW as indicated by the first received record. It will be appreciated, therefore, that the above assignment rationales were developed empirically from analyzing a large number of DB2 DDL command log records. As a result, assignments applicable to a different DBMS, DDL generation focusing on other targets (e.g., to generate DDL that was executed by a specified AUTHID or JOBNAME), or for log records retained in a different set of target tables (i.e., non-catalog tables) may be different and subject to the same empirical analysis.

Figure 5:
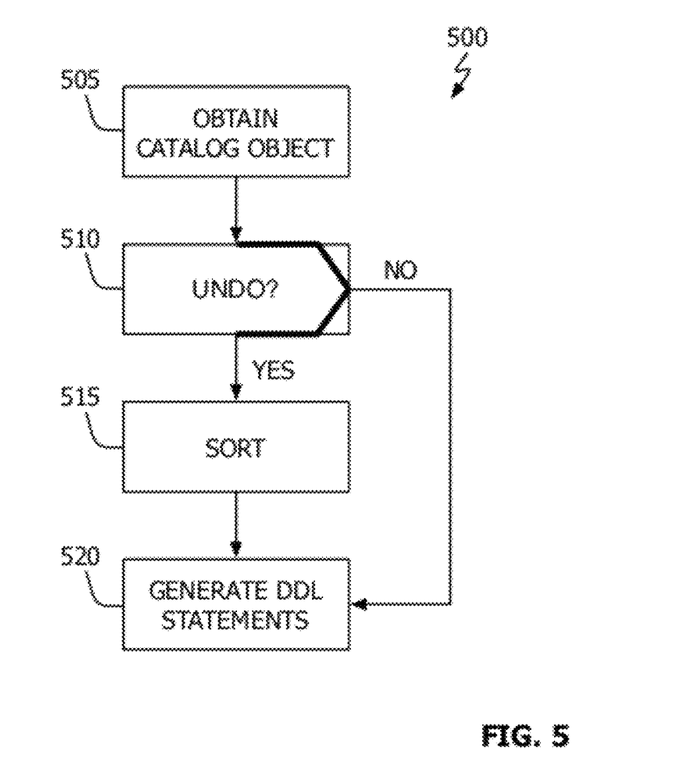
FIG. 5 shows, in flowchart form, DDL statement generation operation in accordance with one embodiment.

Once assigned to a Catalog Object in accordance with block 120, specific information related to the record may be recorded in the Catalog Object (block 125). In one embodiment, the Catalog Object records information from at least the following fields for each record assigned to it: timestamp (210), unit of recovery identifier (225), action (230), target (235) and data (240). Other data that may be captured include, but are not limited to, SSID, Connection Identifier, Connection Type, Correlation Identifier, Authorization Identifier, Plan Name, UOR Commit RBA and UOR Commit Timestamp. Once this information is recorded in the relevant Catalog Object, a check may be made to determine if there are more log records to process (block 130). If additional log records remain to be processed (the "YES" prong of block 130), the next record is obtained (block 135) whereafter operation 100 continues at block 110. If no more records remain to be processed (the "No" prong of block 130), a cleanup operation (block 140) may be performed whereafter processing may continue as shown in FIG. 5.

In one embodiment, only complete units of recovery are processed. That is, only units of recovery whose start and stop times fall within operation 100's specified start and stop times (or RBA's) are retained. Accordingly, those units of recovery that began before operation 100's specified start time may be ignored (that is, no Catalog Objects need be generated). In addition those units of recovery that began after operation 100's specified start time but have not ended at the time of the operation's specified end time, may have Catalog Objects that have not been closed in accordance with block 150 (see discussion below). These Catalog Objects may be discarded whereafter processing may continue as outlined in FIG. 5. In another embodiment, any units of recovery that have been started in accordance with block 120 and not closed in accordance with block 150 at the time of operation 100's specified end time may be completed. Such "open" units of recovery may be completed by continuing to search through the log (in accordance with operation 100), ignoring all other units of recovery.

If the current record is not the first record in a unit of recovery (the "NO" prong of block 115), the record may be inspected to determine if it is part of a unit of recovery already identified and associated with a Catalog Object (block 145). If the current record is not part of (associated with) a unit of recovery identified in accordance with block 115 (the "NO" prong of block 145), it may be discarded whereafter operation 100 continues at block 130. By way of example, if a record is part of a unit of recovery that began before the specified start time of operation 100, it may be safely ignored.

If the current record is associated with a unit of recovery and a Catalog Object (the "YES" prong of block 145), a further check may be made to determine if it is time to break, that is, stop collecting log records for a given DDL statement (block 150). It will be recognized that hundreds of log records may be collected for, or generated as a consequence of, executing a single DDL statement. (See discussion below with respect to FIG. 4.) If the current record does not indicate a break point (the "NO" prong of block 150), operation 100 continues at block 125. If the current record indicates a break point (the "YES" prong of block 150), the record's associated Catalog Object may be closed by capturing the record's information (e.g., as during the acts of bock 125), placing the Catalog Object's associated log record information in the proper order (see discussion below) and externalizing the Catalog Object to memory (e.g., a buffer pool) or a long-term storage device (block 155).

It has been determined that there are cases when an UNDO operation is to be generated (i.e., an UNDO operation based on a Catalog Object's recorded log records) in which log entries are sequenced in an order that, when simply reversed, do not lead to the proper DDL commands. For example: (1) if a dropped table has a foreign key, a trigger or a check constraints requirement, the generated DROP table DDL may be deferred until after the drop foreign key, drop trigger or drop constraints DDL; (2) if a dropped table has a trigger defined, primary key or one or more unique indices, the DDL to drop table, primary key or unique index objects may be deferred until after the drop trigger DDL; (3) if a dropped table has a primary key and children (other table's foreign keys referring to the table's primary key) and check constraints are defined, the DDL to drop primary key and table objects may be deferred until after the drop of children (foreign key) DDL; (4) if a table to be dropped has both primary keys and foreign keys, the DDL to drop both the primary keys and table may be deferred until after the drop foreign key DDL; (5) for a dropped index with an index controlled partition, SYS-TABLEPART records may be needed in order to correctly build the partition key in the drop indexes UNDO operation's CREATE index and, as such, the DDL to drop a table may be deferred until after the drop tablespace DDL; (6) for a drop active version procedure/function, the actual drop DDL may be deferred until after the target procedure/function's other versions have been dropped; and (7) it has further been found that in DB2, version 10, catalog records are updated differently for drop partitioned tablespace and, as a consequence, it may be necessary to defer generation of drop table and drop tablespace DDL until after systablepart records are identified as systablepart records are needed for both drop table and drop tablespace DDL.

Figure 3:
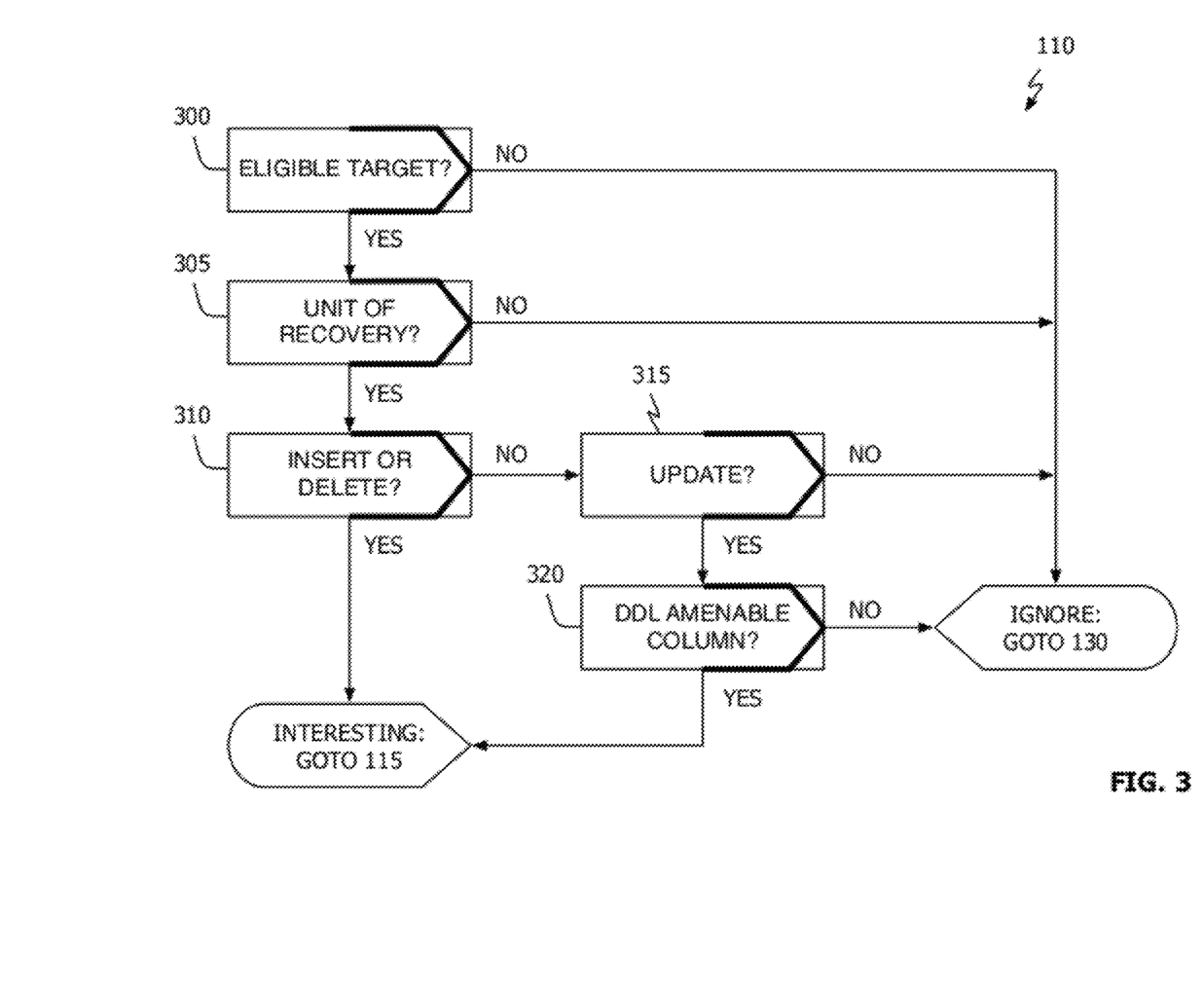
FIG. 3 shows, in flowchart form, log record evaluation operation in accordance with one embodiment.

Referring to FIG. 3, acts in accordance with block 110 may begin by interrogating the current record's target field 235 to determine if it is directed to a table that records activity for which operation 100 is to generate DDL statements (block 300). In one embodiment, only DDL causing insert, delete and update actions against catalog tables is of interest. Accordingly, all records targeting non-catalog tables may be ignored. In addition, it is known that certain catalog tables may not be modified by DDL statements (e.g., the SYSCOLDISTSTATS, SYSINDEXSTATS and SYSTABSTATS tables). These tables may also be considered "ineligible" for the purposes of block 300. If the record's target corresponds to an eligible table (the "YES" prong of block 300), another test may be made to determine if the record is associated with a unit of recovery (block 305). If the record is associated with a unit of recovery (the "YES" prong of block 305), yet another test may be made to determine if the record's action is an insert or delete (block 310). If the record does represent an insert or delete action (the "YES" prong of block 310), it may be concluded that the current record is an "interesting record," whereafter operation 110 continues at block 115. If the current record does not represent an insert or delete action (the "NO" prong of block 310), the record may be interrogated to determine if it represents an update action (block 315). If the record represents an update action (the "YES" prong of block 315), a final check may be made to determine if the column(s) targeted by the record are amenable to DDL modification (block 320). In DB2, version 10, illustrative catalog table columns that may not be modified by DDL statements include, but are not limited to, DBNAME, TSNAME, DBID and OBID. If the current record is directed to a column that can be modified by a DDL statement (the "YES" prong of block 320), it may be concluded that the current record is an interesting record, whereafter operation 110 continues at block 115. If the current record is not directed to an eligible table (the "NO" prong of block 300), is not part of a unit of recovery (the "NO" prong of block 305), does not represent an update action (the "NO" prong of block 315), or is directed to a catalog table column that is not amenable to modification by a DDL statement (the "NO" prong of block 320), it may be concluded that the current record is not an interesting record, whereafter operation 110 continues at block 130.

Figure 4:
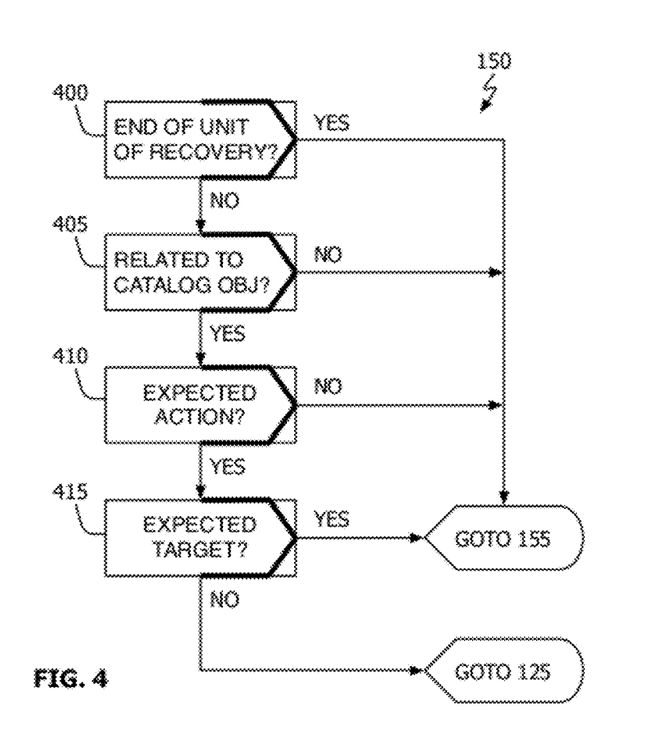
FIG. 4 shows, in flowchart form, DDL break processing in accordance with one embodiment.

Referring to FIG. 4, acts in accordance with block 150 may begin by interrogating the current record's subtype field 220 to determine if it signals the end of a unit of recovery (block 400). If the current record is the last record in a unit of recovery record (the "YES" prong of block 400), the record's unit of recovery Catalog Object may be processed in accordance with block 155. If the current record is not the end of a unit of recovery (the "NO" prong of block 400), a further check may be made to determine if the record's target (e.g., via target field 235) is related to the current Catalog Object type (block 405). By way of example, for a CREATE DATABASE DDL statement, one expects to see an insert into the SYSDATABASE and SYSDBAUTH tables. If the unit of recovery to which the current record belongs has been assigned to a DATABASE Catalog Object (during acts in accordance with block 120) and the current record is an insert, delete or update action into a table other than these two catalog tables, a break is indicated (the "NO" prong of block 405). If the current record's target is related to the record's unit of recovery Catalog Object (the "YES" prong of block 405), yet another check may be made to determine if the record's action (i.e., insert, delete or update) is directed to an expected target (block 410). Again, for a CREATE DATABASE DDL statement, one would expect to see inserts into the SYSDATABASE and SYSDBAUTH tables. If these two insert operations are followed by another insert operation to, for example, the SYSDATABASE table, a break is indicated because this insert does not "make sense" in the context of a CREATE DATABASE DDL statement (the "NO" prong of block 410). If the current record is directed to an expected action (the "YES" prong of block 410), a check may be made to determine if the operation's target has changed (block 415). Using a GRANT DBAUTH DDL statement as an example, one would expect to see inserts into the SYSDBAUTH table for each grantee. While multiple insert actions may be combined into a single GRANT statement, when the name of the table to which authorization is being granted changes (the "YES" prong of block 415), break processing in accordance with block 155 may be indicated. If the target table for the current DDL statement has not changed (the "NO" prong of block 415), record information is collected and retained in the associated Catalog Object (block 125).

It will be understood that determination of what DDL statement generated the captured log records (assumed in the above examples) may be determined through the analysis of log record sequences. For example, such analysis can determine given a first record, that there are only certain following actions that are possible if the following log record is still related to the first. Because this knowledge (and therefore be ability to perform DDL statement break analysis in accordance with block 110 and FIG. 4) may be developed empirically, the exact nature of this knowledge will be particular to a developer's particular DDL and DBMS implementation. While time consuming to perform, this analysis is within the ability for those of ordinary skill in the art having the benefit of this disclosure.

Referring to FIG. 5, DDL generation operation 500 in accordance with one embodiment relies on, and uses, the Catalog Objects generated in accordance with FIG. 1. As a first step, DDL generation operation 500 obtains a Catalog Object (block 505). Once obtained, a check may be made to determine if MIGRATE or UNDO DDL is to be generated (block 510). If the desired DDL is an UNDO operation (the "YES" prong of block 510), the Catalog Object's log record entries may be sorted into descending time sequence (block 515), whereafter DDL statements may be generated (block 520). If, instead, MIGRATE DDL is to be generated (the "NO" prong of block 510), DDL statement generation may proceed directly (block 520). (It will be recognized that this assumes log records are stored in/with the Catalog Object in ascending time order—with exceptions such as those noted above.)

To put the preceding in context and by way of example, consider Table 2 which shows pseudo-DDL statements that create a database, a tablespace within the database, and a table within the tablespace.

TABLE 2

Example Object Creation SQL Statements

CREATE DATABASE mydb;
CREATE TABLESPACE myts IN mydb;
CREATE TABLE my.table
    (COLUMN definitions)
IN mydb.myts;

When producing "MIGRATE" DDL statements from log records created by executing the statements of Table 2, operation 500 may generate CREATE DATABASE, CREATE TABLESPACE, and CREATE TABLE DDL statements in sequence. When generating UNDO" DDL statements from the same log record entries, operation 500 may produce DROP TABLE, DROP TABLESPACE, and DROP DATABASE DDL statements in sequence.

Figure 6A:
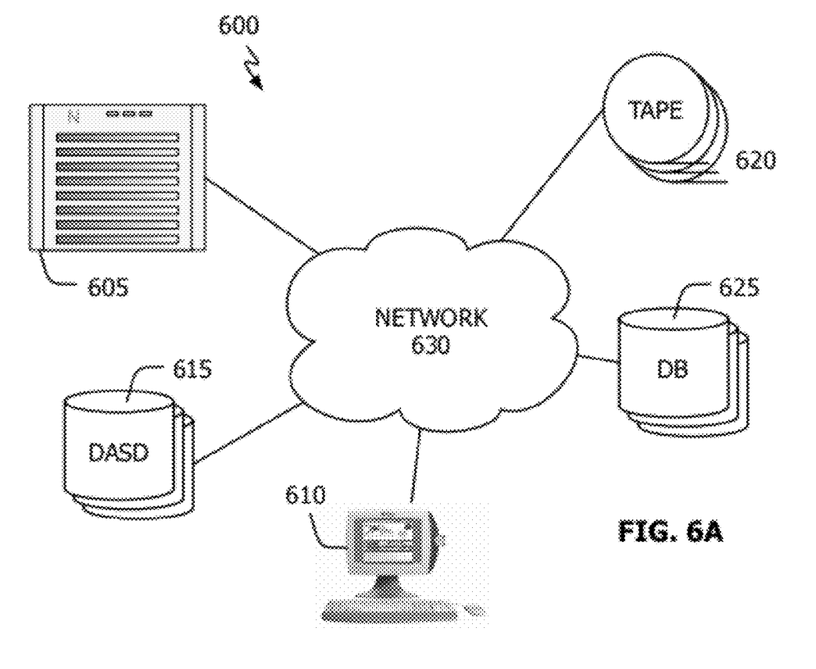
FIG. 6A shows, in block diagram form, an illustrative computer network within which the disclosed methodologies may execute.

Referring to FIG. 6A, in one embodiment acts in accordance with FIGS. 1, 3, 4 and 5 may be performed by one or more devices such as those shown as part of system 600. As shown, system 600 includes mainframe computer system 605, workstation computer system 610, one or more Direct Access Storage Devices (DASD) 615, one or more tape storage units 620 and one or more databases 625 interconnected by network 630. In a large scale database environment, the database being exercised may reside on DASD 615, with individual computer systems (e.g., 605 and 610) executing applications that can access and update that database. It will be recognized that system 600 may include a large number of devices (only a few are shown here for ease of illustration) that may be coupled through multiple networks (all of which are represented by network 630) using any number of technologies (e.g., wireless or wired).

Figure 6B:
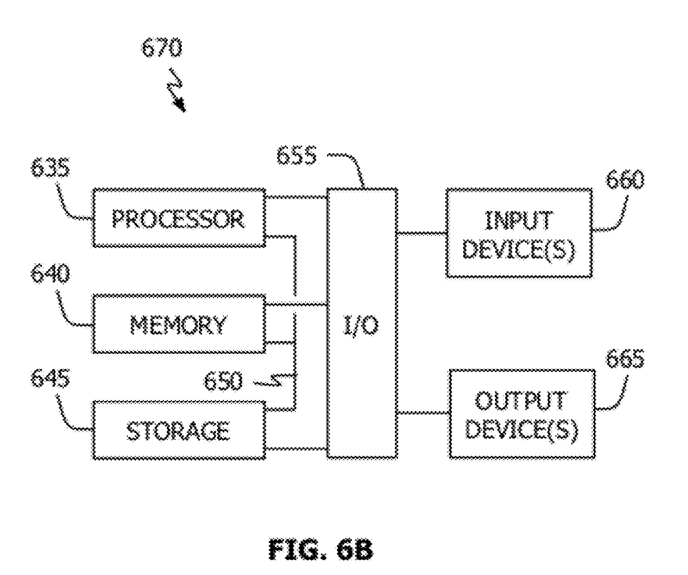
FIG. 6B shows, in block diagram form, an illustrative computer system capable of executing at least a portion of the disclosed embodiments.

Referring now to FIG. 6B, processing devices such as mainframe computer system 605 and workstation 610 may themselves comprise programmable control devices, memory and storage. For example, computer system 670 may include processor 635, memory 640 and storage 645 coupled via bus 650. Computer system 670 may also include input/output circuitry 655 through which one or more input devices 660 (e.g., a keyboard, mouse and/or light pen) and one or more output devices 665 (e.g., a display monitor or printer) may interact with the rest of the computer system. In one embodiment, memory 640 is volatile random access memory used for program execution by processor 636, whereas storage 645 comprises non-volatile storage such as, for example, magnetic and optical storage disks. By way of example, computer program code may be stored on storage 615 or 645. On execution, at least a portion of the computer program code may be transferred from storage 645 to memory 640 where it may be executed by processor 635. When executed, actions in accordance with FIGS. 1 and 3-5 may be realized.

The disclosed techniques are not limited to use with a DB2 database, but may be applied equally to any database system maintaining a log that records information suitable for migration and recovery operations. For example, as described herein Catalog Objects may be used to aggregate log records. If a developer's targets are different from a system's catalog tables, another type of DDL command object may be used. In addition, the disclosed techniques are not limited to a database system in which recovery information is retained in a single log file. For example, database log files may be implemented using any desired or convenient technology (e.g., flat files, structured files or database tables). In addition, the order of steps illustrated in FIGS. 1, 3, 4 and 5 may be different from that shown. Further, some steps may be combined with others or omitted entirely—depending upon the particular implementation desired. In one embodiment, interesting records may be defined differently from that in FIG. 1 (block 110) if a different output is desired. More specifically, operations in accordance with the general principles set forth in FIGS. 1 and 5 may also be used to produce output from other than catalog tables. It will be further recognized that DDL is but one of the output options that can be specified. A Catalog Activity Report is another option that presents a summary report of DDL activity.

Various changes in the materials, components, circuit elements, as well as in the details of the illustrated operational methods are possible without departing from the scope of the following claims. For instance, acts in accordance with FIGS. 1, 3, 4 and 5 may be performed by a computer system executing instructions organized into one or more program modules. A computer system (e.g., computer system 670) may include any programmable controller device including, for example, one or more processing cores (such as that used in some mainframe computer systems) and members of the Intel Atom®, Core®, Pentium® and Celeron® processor families from Intel Corporation or custom designed state machines. (INTEL, INTEL ATOM, CORE, PENTIUM, and CELERON are registered trademarks of the Intel Corporation.) Custom designed state machines may be embodied in a hardware device such as an application specific integrated circuits (ASICs) and field programmable gate array (FPGAs). Devices suitable for tangibly embodying program instructions (e.g., memory 640 and storage 645) include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An automatic database command method, comprising:
    obtaining a plurality of relevant database log entries, the relevant database log entries being directed to database catalog entities;
    determining a first portion of the plurality of relevant database log entries are part of a common unit of recovery, the first portion including a plurality of database log entries;
    assigning the first portion of database log entries to a particular Data Definition Language (DDL) command object based on analysis of attributes of a first entry in the first portion of the database log entries, the particular DDL command object including a timestamp, an action, a target, and data from each of the first portion of database log entries;
    determining a DDL command object break when an action or target of a next database log entry in the first portion is inconsistent with the particular DDL command object;
    storing the particular DDL command object in a memory in response to determining the DDL command object break;
    receiving an indication of an operation type subsequent to the storing, the operation type being an UNDO or a MIGRATE operation type;
    ordering the entries in the particular DDL command object in an order based on the type of operation, the targets, and the actions; and
    generating at least one database command based on the operation type, the action, target, and data in each of the ordered entries in the particular DDL command object.

2. The method of claim 1, wherein obtaining the plurality of relevant database log entries comprises:
    obtaining a database log entry directed to a database catalog entity;
    determining the database log entry is directed to a unit of recovery;
    determining the database log entry was generated as a consequence of a targeted database action; and
    repeating the acts of obtaining and determining for one or more additional database log entries.

3. The method of claim 2, wherein the act of determining the first portion of database log entries comprises determining the database log entry is a first log entry in the common unit of recovery.

4. The method of claim 2, wherein the act of determining the first portion of database log entries comprises determining the database log entry includes information indicating that the common unit of recovery did not begin before a first of the plurality of relevant database log entries was obtained.

5. The method of claim 2, wherein determining the database log entry was generated by the targeted database action comprises determining the database log entry was generated by an insert or delete action.

6. The method of claim 2, wherein determining the database log entry was generated by the targeted database action comprises determining the database log entry was generated by an update action to a column in a database catalog entity that is amenable to update by a data definition language command.

7. The method of claim 1, wherein the database catalog entities include database catalog tables.

8. The method of claim 1, wherein determining the first portion of the plurality of relevant database log entries are part of the common unit of recovery comprises determining each of the first portion of database log entries include information identifying the common unit of recovery.

9. The method of claim 1, wherein determining the first portion of the plurality of relevant database log entries are part of the common unit of recovery comprises:
    determining a first database log entry from the plurality of relevant database log entries is identified as a first database log entry in the common unit of recovery; and
    determining one or more additional database log entries from the plurality of relevant database log entries identifies the common unit of recovery.

10. The method of claim 1, wherein determining the DDL command object break comprises determining the next database log entry includes an indicator identifying it as a final database log entry in the common unit of recovery.

11. The method of claim 1, wherein determining the DDL command catalog object break comprises determining the next database log entry is directed to an action on a database catalog entity inconsistent with the particular DDL command object.

12. The method of claim 1, wherein determining the DDL command object break comprises determining the next database log entry is directed to a database entity inconsistent with the particular DDL command object.

13. The method of claim 1, wherein ordering the first portion of database log entries assigned to the particular DDL command object comprises:
    determining the at least one database command includes a drop table command directed to a table that has a foreign key; and
    ordering those database log entries from the first portion of database log entries directed to a drop foreign key command before those database log entries from the first portion of database log entries directed to the drop table command.

14. The method of claim 1, wherein the assignment to the particular DDL command object is a provisional assignment and the method further comprises:
    determining that attributes of a later database log entry in the first portion of database log entries correspond with another DDL command object; and
    reassigning the first portion of database log entries to the another DDL command object.

15. A non-transitory program storage device, readable by a programmable control device, comprising instructions tangibly stored thereon for causing a computing system to perform operations comprising:
    obtaining a plurality of relevant database log entries, the relevant database log entries being directed to database catalog entities;

determining a first portion of the plurality of relevant database log entries are part of a common unit of recovery, the first portion including a plurality of database log entries;

assigning the first portion of database log entries to a particular Data Definition Language (DDL) command object based on analysis of attributes of a first entry in the first portion of the database log entries, the particular DDL command object including a timestamp, an action, a target, and data from each of the first portion of database log entries;

determining a DDL command object break when an action or a target of a next database log entry in the first portion is inconsistent with the particular DDL command object;

storing the particular DDL command object in a memory;

receiving an indication of an operation type subsequent to the storing, the operation type being an UNDO or a MIGRATE operation type;

ordering the entries in the particular DDL command object in an order based on the type of operation, the targets, and the actions; and generating at least one database command based on the operation type, the action, the target, and the data in each of the ordered entries in the particular DDL command object.

16. The non-transitory program storage device of claim 15, wherein the assignment to the particular DDL command object is a provisional assignment and the instructions tangibly stored on the program storage device include instructions for causing a computing system to perform operations comprising:

determining that attributes of a later database log entry in the first portion of database log entries correspond with another DDL command object; and reassigning the first portion of database log entries to the another DDL command object.

17. A computer network comprising:

one or more computer systems communicatively coupled to the network, each computer system comprising a memory and at least one processor, wherein the one or more computer systems are programmed to collectively perform operations comprising:

obtaining a plurality of relevant database log entries, the relevant database log entries being directed to database catalog entities;

determining a first portion of the plurality of relevant database log entries are part of a common unit of recovery, the first portion including a plurality of database log entries;

assigning the first portion of database log entries to a particular Data Definition Language (DDL) command object based on analysis of attributes of a first entry in the first portion of the database log entries, the particular DDL command object including a timestamp, an action, a target, and data from each of the first portion of database log entries;

determining a DDL command object break when an action or a target of a next database log entry in the first portion is inconsistent with the particular DDL command object;

storing the particular DDL command object;

receiving an indication of an operation type subsequent to the storing, the operation type being an UNDO or a MIGRATE operation type;

ordering the entries in the particular DDL command object in an order based on the type of operation, the targets, and the actions; and generating at least one database command based on the operation type, the action, the target, and the data in each of the ordered entries in the particular DDL command object.

18. The computer network of claim 17, wherein the assignment to the particular DDL command object is a provisional assignment and the one or more computer systems are further programmed to perform operations comprising:

determining that attributes of a later database log entry in the first portion of database log entries correspond with another DDL command object; and reassigning the first portion of database log entries to the another DDL command object.

19. The computer network of claim 17, wherein the operation type is an undo operation and ordering the first portion of database log entries assigned to the particular DDL command object comprises:

determining the at least one database command includes a drop table command directed to a table that has a foreign key; and ordering those database log entries from the first portion of database log entries directed to a drop foreign key command before those database log entries from the first portion of database log entries directed to the drop table command.

20. The computer network of claim 17, wherein determining that the next database log entry is inconsistent with the particular DDL command object comprises determining that the target of the next database log entry is a database entity inconsistent with the particular DDL command object.

* * * * *

UNITED STATES PATENT AND TRADEMARK OFFICE
CERTIFICATE OF CORRECTION

PATENT NO. : 8,924,398 B2  
APPLICATION NO. : 13/070388  
DATED : December 30, 2014  
INVENTOR(S) : Oscar J. Garza et al.

Page 1 of 1

It is certified that error appears in the above-identified patent and that said Letters Patent is hereby corrected as shown below:

In the claims

In column 12, line 33, in claim 11, after "command" delete "catalog".

Signed and Sealed this  
Fifth Day of May, 2015

Michelle K. Lee  
*Director of the United States Patent and Trademark Office*